July 27, 1965  G. T. CHEETHAM ETAL  3,196,514
APPARATUS FOR CUTTING PILE FABRIC
Filed June 18, 1962
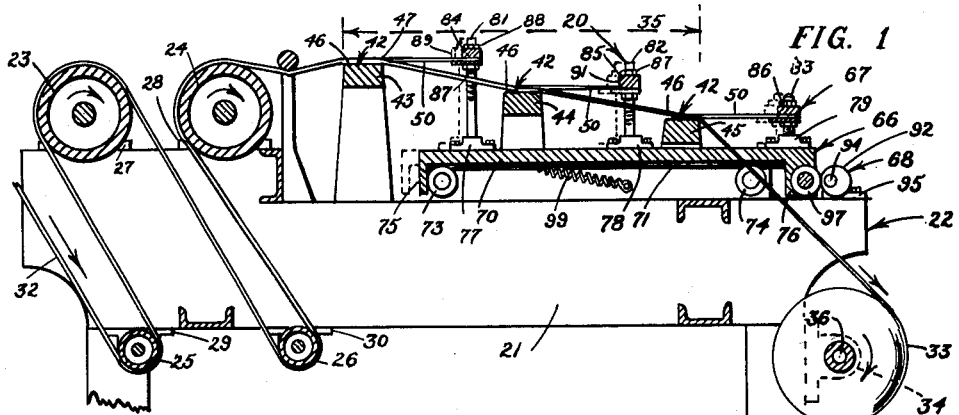
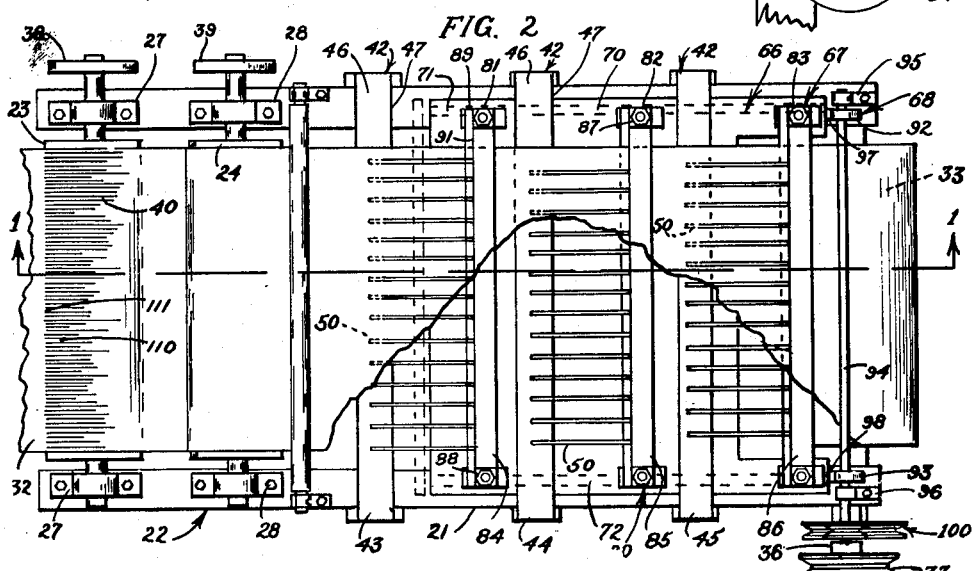
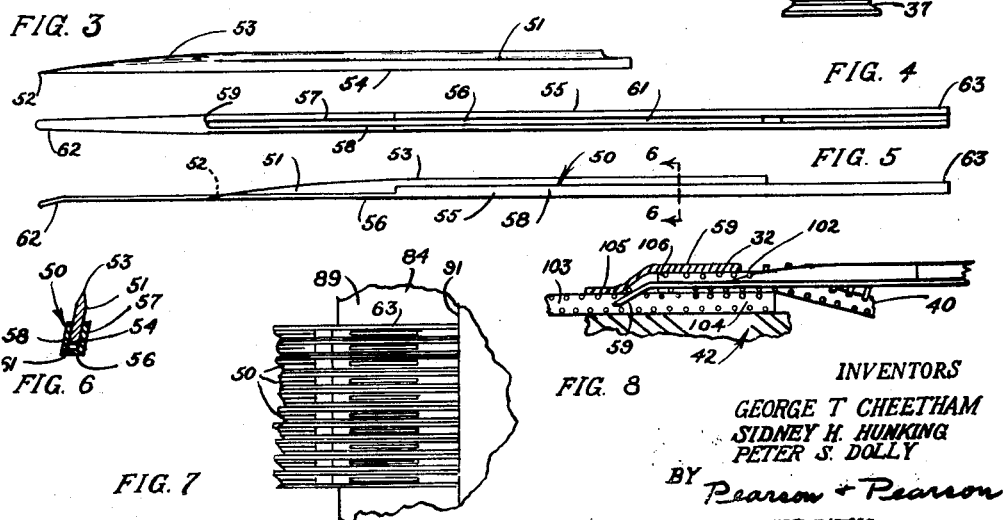
INVENTORS
GEORGE T CHEETHAM
SIDNEY H. HUNKING
PETER S. DOLLY
BY Pearson + Pearson
ATTORNEYS

United States Patent Office 3,196,514
Patented July 27, 1965

3,196,514
APPARATUS FOR CUTTING PILE FABRIC
George T. Cheetham, 855 Bridge St., and Sidney H. Hunking, 42 Holbrook Ave., both of Lowell, Mass., and Peter S. Dolly, 433 Putney St., St. Lamberts, Quebec, Canada
Filed June 18, 1962, Ser. No. 203,074
4 Claims. (Cl. 26—9)

This invention relates to the art of cutting pile in flat woven fabric and especially to fabric of the corduroy and velveteen type.

In the corduroy art it has long been customary to insert cutting guides in the races of the fabric and to provide rotary disc cutters, co-operable with the guides, to form the pile as the cloth advances past the cutters. The races of corduroy fabric are relatively large and can accommodate the conventional guides especially since the discs cut from the outside into the race occupied by the guide rather than occupying space within the race.

In the velveteen art, such disc cutters and interior race guides are not used because the races are relatively small. For example corduroy may have about sixteen to twenty-two races to the inch while velveteen may have about forty-two races to the inch. The cutting of velveteen is a time consuming task still accomplished in many factories on a machine in which a web of flat woven fabric is joined end to end forming an overlapping seam, the web passed through the machine and past a single knife which cuts a single race. The operative must stop the machine, move the seam past the knife, move the knife laterally to the next race and repeat the cycle until every race has been cut. The knife normally wears out when about five inches of width of the web has been cut, requiring replacement and considerable material is lost in the vicinity of the seam.

The principal object of this invention is to provide a pile cutting apparatus and method whereby all of the races of a web of fabric may be cut from the inside outwardly in one pass through a machine whether the fabric is corduroy or velveteen.

Another object of the invention is to provide pile cutting apparatus which includes an individual knife within each race of the fabric mounted to vibrate within the race for cutting a complete transverse pile without unduly dulling the knives.

A further object of the invention is to provide pile cutting apparatus having a bank of elongated knives for cutting every race of a flat woven fabric in one pass thereby, the tips of the knives tunnelling along the races of the advancing fabric while the bases of the knives are relatively loosely supported on a shelf to substantially "float" thereon.

Still another object of the invention is to provide a machine and method for cutting pile fabrics in one pass at a rate of about sixteen yards a minute, with only about ten minutes set-up time for each two hundred yard length thereof.

A still further object of the invention is to provide a machine and method for simultaneously cutting a pile from within the races, entirely across a web, in one pass, the web being continuous and made up of separate lengths overlapped end to end and the knives of the apparatus being arranged to pass each overlap without misalignment of the races in each successive length.

Other objects and advantages of the machine and method of this invention will be apparent from the claims, description of the drawings and from the drawings in which:

FIG. 1 is a side elevation, of a machine constructed in accordance with the invention, in section on line 1—1 of FIG. 2, FIG. 2 is a plan view of the device shown in FIG. 1 with parts broken away, FIG. 3 is a side elevation of a cutting blade, on an enlarged scale, FIG. 4 is a plan view, on the scale of FIG. 3, of a sheath for the blade, FIG. 5 is a side elevation, on the scale of FIGS. 3 and 4, of a cutting knife with the blade in the sheath, FIG. 6 is an end elevation, on a still further enlarged scale on line 6—6 of FIG. 5, FIG. 7 is a plan view, on the scale of FIGURES 3–5 showing the base of the cutting knives resting on the shelf of the knife carrier means, and FIG. 8 is a side elevation on an enlarged scale showing the knives passing a seam in a continuous web made up of temporarily joined lengths of fabric. The knife is within a race of the fabric riding on the lower yarns and cutting the float yarns, the yarns being shown as small circles.

As shown in FIGURES 1 and 2, the pile cutting apparatus 20 of the invention is mounted on the frame 21 of the machine 22, the machine having transverse rolls 23, 24, 25 and 26 journalled in bearing blocks 27, 28, 29 and 30 for feeding a web of fabric 32 in the direction of the arrows. A wind-up drum or roll 33 is journalled in bearing blocks such as 34 and rotated at a predetermined surface speed, such as sixteen yards a minute, for advancing the web 32 along a predetermined path through the cutting station 35 of the machine. The shaft 36 of wind-up drum 33 is driven by the drive pulley 37, or by an electric motor or by other well known means not shown, such drive and take-up mechanisms being well known in the trade. Conventional brakes 38 and 39 are provided on the rolls 23 and 24 for maintaining tension on the web 32 to keep the longitudinally extending races 40 taut and straight during the cutting of the pile.

The web 32 may vary in width but is usually not more than fifty-four inches wide and about one hundred and fifty to two hundred yards in length. If web 32 is corduroy, there may be about sixteen races to the inch or about eight hundred sixty-four races 40 across the web. If web 32 is velveteen, there may be about forty-two races to the inch or about twenty-two hundred and sixty eight races 40 across the web. It can be understood that if the float yarns of each race must be cut into pile, one race at a time for the full length of the web, with all the consequent removal and reinsertion of the knife, passing of the seam in the endless web, sharpening or substitution of the cutting blade, etc., the full time of an operator for at least a day is consumed in cutting the pile of the web.

It will also be understood that even if three or four races are cut at one time, the required period will still be relatively long and the fabric costly. The cutting of all eight hundred and sixty-four races to make corduroy, or all twenty two hundred and sixty-eight races to make velveteen, in one pass through the machine and from the inside outwardly, has not been accomplished on any commercial machine prior to this invention perhaps for the reason that it was believed there would be no room for the knives within the races, that the cloth would be twisted and distorted or that the knives would not remain in the races.

In the apparatus 20 of this invention, it has been found that in cutting corduroy of fifty-four inch width, a single transversely extending bank of eight hundred and sixty-four elongated knives can be used, with the bases of the individual knives juxtaposed and the tips of the knives all simultaneously cutting the float yarns from within their respective races 40. Similarly it has been found that in cutting velveteen, three transversely extending banks of seven hundred and fifty-six elongated knives can be used, with the bases of the knives juxtaposed fourteen to the inch and each bank cutting every first, second or third race respectively across the web.

The pile cutting apparatus includes straight edge means 42 extending laterally or transversely under the web 32 at cutting station 35 for directing the fabric slightly out of its normal path. Means 42 comprises at least one and preferably three stationary cross bars 43, 44 and 45 mounted on frame 21 to extend thereacross at different levels. Each cross bar such as 43 is provided with a flat upper face 46 for supporting the web 32, and thereby supporting the tips of the knives within the races of the web, as the web is advanced across the face 46. The rearward, upper corner edge 47 of each cross bar forms a straight edge which permits the web 32 to be directed slightly downward out of the horizontal path of the web over the face 46 and which permits the bases of the knives to be in straight line extension of the races of the fabric advancing over the horizontal flat face 46 of each bar.

As best shown in FIGURES 3–6, each knife 50 is elongated, preferably about five inches in length and about one sixteenth of an inch in overall width. The knife 50 includes a cutting blade 51 having a point 52, a tapered, upper cutting edge 53, and a blunt lower edge 54. The knife 50 also includes a sheath, scabbard, or guide 55 having a flat bottom wall 56, a pair of integral, side walls 57 and 58 upstanding from bottom wall 56 and a downturned forward tip 59. The bottom wall 56 is provided with an elongated slot 61 for receiving the blade 51 with the blade supported between the side walls 57 and 58, the point 52 of the blade being masked behind the rounded tip 59 of the sheath to prevent any possibility of the point cutting through the underside of the races 40.

The sheath 55 thus is of U-shaped cross section intermediate of its length to retain the blade 51 and of flat cross section at the forward, or tip end 62. The rearward end 63 of the sheath 55 forms the base of the knife and is of U-shaped cross section. The downturned tips 59 and flat forward ends 62 of the knives 50 can be inserted into juxtaposed races 40 of corduroy to spread and flatten juxtaposed races while the upper edge 53 of the blade 51 cuts the float yarns into pile, since the knives and races are both about one sixteenth inches in width. In velveteen the races are only about one third as wide but the knives 50 can be inserted therein to occupy every third race and spread the races slightly over its adjacent races. As shown in FIG. 6 it is conventional to slightly tilt a velveteen knife in order to secure a difference in height on each side of the pile cut from a float yarn and the side walls 57 and 58 are therefore shown inclined slightly from the vertical.

Knife vibration means 66 is provided to axially reciprocate, or vibrate, the knives 50 within the races 40 and along the longitudinal path of the fabric to secure a slicing cut and to increase the life of the knives. Vibration means 66 is preferably mechanical in the form of knife carrier means 67 and actuation means 68 for axially vibrating, or reciprocating the means 67.

Knife carrier means 67 is in the form of a carriage 70 having a longitudinally extending track 71 and 72 on each opposite side thereof travelling on suitable rollers 73 and 74 journalled on frame 21. The opposite tracks 71 and 72 are the side pieces of a hollow rectangular frame having the forward and rearward cross members 75 and 76 constituting limit stops. Three pairs of sockets such as 77, 78 and 79 are longitudinally spaced along tracks 71 and 72, each having an upstanding, threaded post such as 81, 82 or 83 therein for supporting the three cross heads 84, 85 and 86 at the desired levels by means of the nuts 87 and 88. Each cross head such as 84 includes a forward horizontal shelf 89 upon which the bases 63 of the knives 50 of each bank of knives are supported without attachment thereto. Each cross head such as 84 also includes the forward vertical face 91 which engages the U-shaped terminal rearward end of each knife 50 for advancing the knife within its race 40.

Actuation means 68 preferably comprises the eccentric cams 92 and 93 mounted near each opposite end of a shaft 94 and journalled in bearings 95 and 96 carried by frame 21. The cams 92 and 93 engage suitable roller followers 97 and 98 on rearward cross member 76 and are arranged to move the carriage 71 forwardly through a stroke of about one half inch to thereby advance all of the knives 50. The web 32 is, of course, advancing in the opposite direction toward the knives.

A return spring 99 connects carriage 70 to frame 21 to retract the carriage at a considerably higher speed than that of the fabric after each forward movement by the cams. The cam shaft 94 is connected by a power train 100 to the shaft 36 of the wind-up drum and preferably vibrates the knives 50 at the rate of about 2300 strokes per minute when the cloth is advancing at about 16 yards/minute.

Because of the rectangular hollow construction and short stroke of carriage 70, the web 32 may pass therethrough down to the wind-up drum. As shown in FIG. 7 the bases 63 of the knives merely rest on the shelf 89, with the knives in extension of the axes of the races traveling over the flat upper face 46 of each cross bar 43, 44 and 45. Spacers can be used, if desired. For example, if it was desired to use two banks of knives 50 on corduroy but it has been found that the knives remain properly aligned without spacers and apparently "float" to adjust themselves with no tendency to pierce the fabric or otherwise become misaligned. Replacement of a single knife is not usually necessary but can be accomplished with ease.

As shown in FIG. 8 one of the principal advantages of this invention is the fact that the knives can pass a seam while remaining aligned with the races of the fabric. Thus it is not necessary to make an endless loop of each web, as in the prior art, and to lose a substantial portion of the web in the vicinity of the seam. Instead, a plurality of lengths of fabric can be temporarily joined end to end into a continuous web 32 of indefinite length.

In FIG. 8 the web 32 comprises at least two lengths 102 and 103 of identical fabric overlapped at 104 for about one inch. The races 40 of each fabric are carefully aligned with each other and the overlap secured by a transverse strip of pressure sensitive tape 105. The tape 105 covers the terminal end of the upper face 106 of the first length 102 and the adjacent portion of the upper face of the next succeeding length 103 and guides the tips 59 of the knives emerging from the ends of the races 40 of length 102 down through the float yarns of the length 103 and into the races 40 thereof. Thus the machine need not be stopped at each seam and production is continuous.

The corduroy or velveteen produced by this invention is washed subsequent to the cutting of the pile. Every tenth or twentieth warp strand such as 110 and 111 (FIG. 3) is, therefore, dyed with a washable color to contrast with the remaining warp strands and permit the operative to align the races of two successive lengths of fabric to form an overlap seam such as shown in FIG. 8, or a butt seam. In the case of a butt seam, the seam is underlaid with a transverse upper and lower strip of cloth, or tape, suitably adhered by a waterproof adhesive, to the adjacent ends of the lengths, for guiding the tips 59 from the races of one length to the races of the succeeding length of fabric.

In an overlap joint the purpose of the overlying tape 105 is not only to affix the races in alignment but also to depress the tips 59 down into the races of the next successive length of fabric. Such depression or flexing of the tips downwardly is not necessary in a butt joint and it will be obvious that it could be accomplished magnetically, if desired, since the knives are preferably of magnetizable material such as steel.

While mechanical vibration means is preferred, it will be obvious that electrical vibration means of any well known type could be used, for example transducers with variable rates of vibration, the same being commercially available.

A vibration rate of twenty-three hundred strokes per minute has been found to be desirable for cutting fabric advancing at the rate of about sixteen yards per minute. If the rate of advance is doubled to thirty-two yards per minute, the rate of vibration is also doubled to forty-six hundred strokes per minute.

We claim:

1. Apparatus for cutting the float yarns in all of the races of a pile fabric web in one pass of said web through a pile cutting machine, said apparatus comprising:

means for advancing said web at a predetermined speed along a longitudinal path through a cutting station on said machine;

a plurality of individual, elongated, pile cutting knives, one for each race of said fabric;

each said knife including a sheath and an upstanding blade with an upper, tapered, cutting edge thereon, the forward portion of each said sheath and blade being inserted in one of said races to cut the float yarns thereof from inside the race;

free terminal, rearward ends on said knives projecting from said races in transverse alignment at said cutting station;

and power actuated vibration means at said station including a longitudinally movable carriage extending entirely across said machine at said cutting station;

said carriage having a transversely extending shelf supporting the rearward ends of said knives and a vertical face abutting, and engaging, the rearward ends of said knives for advancing said knives within said races;

said vibration means being operable on all of the free terminal rearward ends of said knives to periodically advance said knives into said races with relatively short, high speed strokes thereby lengthening the life of said cutting edges.

2. Apparatus as specified in claim 1 wherein:

the sheath of each said knife includes a flat portion in front of said blade with a rounded, downturned tip for riding on the bottom of a race without cutting the same;

and the point of each blade is masked behind the said tip of its sheath.

3. Apparatus as specified in claim 1 wherein:

said power actuated vibration means includes a cam for advancing said carriage through a rectilinear stroke of about one half inch, a spring for retracting said carriage at a considerably higher speed than the said speed of advance of said fabric and actuation means rotating said cam to vibrate said carriage at about 2,300 strokes per minute to produce a multiplicity of short, slicing cuts.

4. Apparatus as specified in claim 1 wherein:

said carriage includes at least one additional shelf at a different level from said first mentioned shelf, said additional shelf having a vertical face identical with said first mentioned vertical face;

and said knives are divided into at least two laterally staggered banks, the rearward ends of each said bank of knives being supported on one of said shelves and abutting the vertical face thereof in transverse alignment;

said banks of knives being vibrated in unison but each knife of each bank having space on each opposite side thereof to flatten and distend its race.

References Cited by the Examiner

UNITED STATES PATENTS

| 776,548 | 12/04 | Read et al. | 26—9 |
| 1,557,345 | 10/25 | Schumacher | 26—8 |
| 2,196,471 | 4/40 | Moody et al. | 26—8 |
| 2,960,748 | 11/60 | Card | 26—12 |

FOREIGN PATENTS

| 474,765 | 12/14 | France. |
| 475,971 | 4/15 | France. |
| 13,381 | 1850 | Great Britain. |
| 15,980 | 1892 | Great Britain. |

DONALD W. PARKER, *Primary Examiner.*

RUSSELL C. MADER, *Examiner.*